Patented July 5, 1949

2,475,485

UNITED STATES PATENT OFFICE 2,475,485

TREATMENT OF DRILLING FLUIDS

Milton Dyke and Edward Samuel Self, San Marino, Calif., assignors to Oil Well Chemical and Materials Company, Inc., Los Angeles, Calif., a corporation of California No Drawing. Application December 15, 1948, Serial No. 65,513

6 Claims. (Cl. 252—8.5)

This invention relates to the treatment of drilling fluids, and particularly the treatment of water base drilling fluids such as are employed in the rotary drilling of oil and gas wells.

This application is a continuation-in-part of our copending application, Serial No. 665,898, for Treatment of drilling fluids, filed April 29, 1946 (now Patent No. 2,468,657), and our co-pending application, Serial No. 762,530, filed July 21, 1947, for Treatment of drilling fluids (now Patent No. 2,468,658).

In drilling wells by the rotary method, it is necessary to circulate a drilling fluid in the bore hole to lubricate the drill, to carry the cuttings up to the surface, to hold down the formation pressure, and to form on the walls of the bore hole a sheath or cake which prevents the drilling fluid from escaping into the formation.

Drilling fluids of the water base type consist of a clay suspended in water, to which weighting materials such as bentonite, galena, iron oxide, etc., are sometimes added to increase the specific gravity of said drilling fluid. The drilling fluid may be made from the clay which occurs at the location of the well, or may be synthetically compounded from the clay and mud bases of commerce, including bentonite, beidellite and Mojave Lake clays.

In order to perform its functions, as has been above noted, the composition and condition of the drilling fluid must be rather closely controlled, and that is particularly true of its water loss to the formation and its viscosity, for if the water loss be too high, the filter cake on the wall builds up to such an extent that circulation of the mud fluid between the drill pipe and the walls of the hole is greatly impeded. Still further reasons for keeping the filter loss at the lowest possible level are to prevent caving of the walls of the bore hole, and to obtain the best possible results when cementing the casing. Still another reason for keeping water loss at a minimum is that when contacting the oil or gas sands, the escape of water from the drilling fluid into the oil or gas sand blocks the flow of oil or gas into the bore hole, and thereby lessens production from the producing sands. As aforesaid, lowering the fluid loss will usually result in reducing the tendency of the bore hole to cave, and results in a straighter bore hole. However, depending on the nature of the filtrate, drilling fluids with equivalent filter losses may differ in their ability to reduce caving, and/or produce the straightest possible bore hole. A commercial concern renders a service to the oil industry, giving said oil companies a log record of the deviations or caving-in of the bore hole.

An object of this invention, therefore, is to provide an improved water base drilling fluid and a treatment for water base drilling fluid for effectively lowering the water loss of said fluid.

A still further object is to provide a treatment for a drilling fluid having the combined effect of reducing the water loss of said drilling fluid, and/or reducing the deviations and/or cavities in a bore hole to produce a substantially straight bore hole.

Another object of this invention is to provide an improved process for the treatment of drilling fluids with the materials and combinations thereof hereinafter set forth.

Still another object is to provide a water base drilling fluid which has improved qualities and characteristics adapting it particularly for its intended use.

A further object will appear from the description to follow, and it is understood that modifications thereof are included within the scope of the invention as set out in the appended claims.

One or more of the aforesaid objects may be accomplished by incorporating a small amount of alkali metal rosin acid soap and an antifoaming agent into a water base drilling fluid.

The term alkali metal rosin soap is used particularly herein to describe soaps prepared from rosin acids derived from pine trees. As may be noted in the literature, the extrusions or extracts from pine trees, particularly the southern pine trees, comprise turpentine and rosin. The rosin may be converted to soaps suitable for use in accordance with our invention by treatment with either sodium hydroxide or potassium hydroxide, but preferably with sodium hydroxide. Such rosin soaps are sold commercially by vendors of products referred to as naval stores. These soaps may be prepared from the rosin from living pine trees, i. e., gum rosin, or from the rosin obtained from dead wood usually stumps which is termed wood rosin. The sodium wood rosin soaps are especially preferred for our purpose.

The alkali metal rosin soaps, as have been described above, may be produced as liquid soap or dry soaps. It will be found more convenient for oil field handling to dehydrate the rosin soaps used in accordance with our invention by such methods as drum, and particularly spray dry. The spray dried rosin soaps will usually contain from about 5% to 12% water. In order to facilitate packaging, storing and/or warehousing of the dried rosin soaps, it will be found advantageous to incorporate from 5% to 20% by weight of clay, preferably of the so-called swelling type bentonite clay.

A further material suitable as an aid in storing dried rosin soaps is barium sulfate, which lends further utility to a drilling fluid when increased weights are desired. The barytes should be used in amounts from about 5% to 25%.

To particularly illustrate our invention, a drilling fluid was prepared by intimately mixing 1680 grams of Rogers Lake dry clay with 2,000 grams of El Monte tap water from one-half hour, with an electric stirrer. The Rogers Lake clay is a commercial mud-making material used throughout the oil fields of California. The resulting water base drilling fluid, both alone and in combination with alkali metal rosin soaps, and an anti-foaming agent, was tested as hereinafter set out, to evaluate the effectiveness of said combination of rosin soaps and anti-foamant, for the treatment of water base drilling fluids.

The water base drilling fluid prepared with the Rogers Lake clay, as above noted, was tested in an A. P. I. filter press tester, together with varying amounts of anti-foamant and sodium rosin soap. The sodium rosin soap was a commercially available dried granulated sodium rosin soap. The results in terms of the A. P. I. filter tests were as follows:

Test No. 1

Rogers Lake drilling fluid, no additive _____ cc__ 500

| Minutes of test | Cc. fluid loss |
|---|---|
| 5 | 1.8 |
| 15 | 4.0 |
| 30 | 6.0 |

Test No. 2

Rogers Lake drilling fluid _____ cc__ 475
Crude oil _____ cc__ 25
Sodium rosin soap _____ gr__ 10

| Minutes of test | Cc. fluid loss |
|---|---|
| 5 | 1 |
| 15 | 2.6 |
| 30 | 4.0 |

Test No. 3

Rogers Lake drilling fluid _____ cc__ 475
Crude oil _____ cc__ 25
Sodium rosin soap _____ gr__ 15

| Minutes of test | Cc. fluid loss |
|---|---|
| 5 | 1 |
| 15 | 1.7 |
| 30 | 2.6 |

Test No. 4

Rogers Lake drilling fluid _____ cc__ 475
Crude oil _____ cc__ 25
Sodium rosin soap _____ gr__ 20

| Minutes of test | Cc. fluid loss |
|---|---|
| 5 | .4 |
| 15 | 1.4 |
| 30 | 2.3 |

Test No. 5

Rogers Lake drilling fluid _____ cc__ 450
Crude oil _____ cc__ 50
Sodium rosin soap _____ gr__ 15

| Minutes of test | Cc. fluid loss |
|---|---|
| 5 | .7 |
| 15 | 1.7 |
| 30 | 2.9 |

The drilling fluids prepared and tested with our additive, as noted in the table above, had excellent thixotropic properties, and produced an exceptionally soft filter cake. The value of such a soft filter cake will be appreciated by production engineers who prefer a complete removal of the mud cake from the walls of the bore hole, when the well is put on production.

In order to further test drilling fluids prepared in accordance with our method, a field test was performed on a well being drilled with a water base drilling fluid in a California oil field. The water base drilling fluid used in this well was prepared from a commercial Mojave Lake clay known as Pit 34 clay. The drilling fluid, prior to treatment, had 11 cc. filter loss in thirty minutes, as measured in the standard A. P. I. filter press. After the well had been drilled to 2500 feet, the drilling fluid was treated with the combination of 10 lbs. per barrel of a commercially available dried granulated sodium rosin soap and 20% by volume of a 25 A. P. I. gravity California crude. Following the said treatment of the drilling fluid, the fluid loss was reduced to 2 cc. in thirty minutes as measured by the A. P. I. filter method. Prior to the treatment of the drilling fluid, the bore hole varied appreciably in diameter, as shown by caliper logs. Below the 2500 foot level, or in the zone drilled with the drilling fluid, treated according to our method, the caliper logs resembled a straight line, i. e., the well had substantially no deviation in diameter. In other wells drilled in this same field, with the same type of water base drilling fluid treated with starch to give a fluid loss of approximately 2 cc greater deviation in bore hole diameter was noted than in the well having a 2 cc. filter loss in accordance with our treatment. In other words, the filtrate from the drilling fluid treated by our method appeared to cause less swelling and caving of the clays in the formation than the filtrate from drilling fluids treated by the starch method.

In accordance with our invention, clay water drilling fluid treated by our method may be treated further with tannins such as chestnut bark or quebracho, in order to give lower yield values and maintain low water losses. For example, a 475 cc. suspension of Rogers Lake clay, 25 cc. of crude oil, prepared as has been described in the foregoing, was treated with 3 grams of chestnut bark and 15 grams of a commercial sodium rosin soap. The yield value of the suspension was appreciably reduced and the suspension had low filter loss characteristics.

In a combination treatment with tannins and alkali metal rosinate soaps, the tannins should be present in an amount equal to about 5% to 40% by weight of said alkali metal rosin soaps, depending upon the yield values desired in the clay water soaps. A preferred quantity for our treatment is from 10% to 20%.

The anti-foaming agents that have been referred to herein as a portion of our combination treatment of water base drilling fluids comprise materials such as alcohol, benzine, pine oil, and petroleum oil, such as crude oil, fuel oil, kerosene and the like. An especially preferred material for our treatment is petroleum oil, and particularly high gravity petroleum oils, ranging from 30 to 50 A. P. I. gravity. The addition of only small quantities of said anti-foaming agents combine with our alkali metal rosin soaps to increase the effectiveness of our drilling fluid treatment. Effective quantities of anti-foaming agent have been found to be of the order of 2% to 5% of the volume of the drilling fluid being treated. It will be understood, however, that larger quantities, such as 20% to 30%, are not precluded.

In accordance with our treatment of drilling fluids, the alkali metal rosin soaps should be used in small quantities such as 1% to 6% by weight (dry basis), and preferably 2% to 4% by weight of the drilling fluid treated. The exact amount to be used substantially within these limits will vary with the filter loss desired.

From the foregoing, it will be appreciated that we have provided a new and novel treatment for increasing the efficiency of water base drilling fluids. While our invention has been described, it is intended that the description shall be taken as illustrative, and that changes may be made in the products and processes within the scope of the appended claims.

We claim:

1. A water clay base drilling fluid of suitable viscosity for use in oil and gas well drilling, said fluid consisting essentially of water, clay and a water-soluble alkali metal rosin soap in an amount of from 1 to 6% by weight on a dry basis of the weight of the drilling fluid treated and petroleum oil in an amount sufficient to inhibit substantial foaming of the resulting drilling fluid.

2. A water clay base drilling fluid of suitable viscosity for use in oil and gas well drilling, said fluid consisting essentially of water, clay and a sodium rosin soap in an amount of from 1 to 6% by weight on a dry basis of the weight of the drilling fluid treated and a sufficient quantity of petroleum oil as an anti-foaming agent to inhibit foaming of the resulting drilling fluid.

3. The process of circulating a drilling fluid in a well being drilled for the production of oil or gas to form a substantially water impervious sheath on the walls of the bore hole of said well and to lubricate the bit used in the drilling of said well, which comprises: preparing a water clay drilling fluid of suitable viscosity for use in oil and gas well drilling, and mixing said fluid with a water-soluble alkali metal rosin soap in an amount of from 1 to 6% by weight on a dry basis of the weight of the drilling fluid treated and petroleum oil in an amount sufficient to inhibit substantial foaming of said water clay rosin soap drilling fluid when employed as a circulating medium in an oil or gas well, and circulating the drilling fluid so produced in a well bore hole whereby a substantially impervious sheath is formed on the walls of said bore hole.

4. The process of circulating a drilling fluid in a well being drilled for the production of oil or gas to form a substantially water impervious sheath on the walls of the bore hole of said well and to lubricate the bit used in the drilling of said well, which comprises: preparing a water-clay drilling fluid of suitable viscosity for use in oil and gas well drilling, and mixing said fluid with a sodium rosin soap in an amount of from 1 to 6% by weight on a dry basis of the weight of the drilling fluid treated and petroleum oil as an anti-foaming agent in an amount sufficient to inhibit foaming of said water-clay-rosin soap drilling fluid when employed as a circulating medium in an oil or gas well, and circulating the drilling fluid so produced in a well bore hole whereby a substantially impervious sheath is formed on the walls of said bore hole.

5. The process of circulating a drilling fluid in a well being drilled for the production of oil or gas to form a substantially water impervious sheath on the walls of the bore hole of said well and to lubricate the bit used in the drilling of said well, which comprises: mixing with a water clay drilling fluid of suitable viscosity for use in oil and gas well drilling about 10 pounds per barrel of said drilling fluid of a commercial dried granulated sodium rosin soap and about 20% by volume of crude petroleum oil and circulating the resulting fluid in a well bore hole whereby a substantially impervious sheath is formed on the walls of said bore hole.

6. The process of improving the fluid loss characteristics of a water clay base drilling fluid of suitable viscosity for use in oil and gas well drilling, comprising admixing therewith a sodium rosin soap in an amount of from 2 to 4% by weight on a dry basis of the weight of the drilling fluid treated and an amount of a petroleum oil sufficient to inhibit foaming of said drilling fluid when employed as a circulating medium in an oil or gas well.

MILTON DYKE.
EDWARD SAMUEL SELF.

REFERENCES CITED

The following references are of record in the file of this patent:

UNITED STATES PATENTS

| Number | Name | Date |
|---|---|---|
| 1,819,646 | Loomis et al. | Aug. 18, 1931 |
| 1,833,772 | Bradshaw | Nov. 24, 1931 |
| 1,964,641 | Mathias | June 26, 1934 |
| 2,065,762 | Stanley | Dec. 29, 1936 |
| 2,109,858 | Cannon | Mar. 1, 1938 |
| 2,209,591 | Barnes | July 30, 1940 |
| 2,286,835 | Robinson et al. | June 16, 1942 |
| 2,430,039 | Anderson | Nov. 4, 1947 |

OTHER REFERENCES

Berkman and Egloff: Emulsions and Foams, pages 147, 149 and 232. Published by Reinhold Publishing Corporation of New York.